United States Patent
Ohashi et al.

(10) Patent No.: US 11,970,631 B2
(45) Date of Patent: Apr. 30, 2024

(54) CONDUCTIVE PASTE AND CONDUCTIVE FILM FORMED USING THE SAME

(71) Applicant: Panasonic Intellectual Property Management Co., Ltd., Osaka (JP)

(72) Inventors: Naomichi Ohashi, Hyogo (JP); Koso Matsuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/805,328

(22) Filed: Jun. 3, 2022

(65) Prior Publication Data

US 2022/0403183 A1 Dec. 22, 2022

(30) Foreign Application Priority Data

Jun. 18, 2021 (JP) .................. 2021-101683

(51) Int. Cl.
| | |
|---|---|
| *H01B 1/02* | (2006.01) |
| *B23K 1/00* | (2006.01) |
| *B23K 35/24* | (2006.01) |
| *C09D 5/24* | (2006.01) |
| *C09D 7/20* | (2018.01) |
| *C09D 7/61* | (2018.01) |
| *H01B 1/16* | (2006.01) |
| *H01B 1/18* | (2006.01) |

(52) U.S. Cl.
CPC .................. *C09D 5/24* (2013.01); *C09D 7/20* (2018.01); *C09D 7/61* (2018.01); *H01B 1/16* (2013.01); *H01B 1/18* (2013.01)

(58) Field of Classification Search
CPC . B22F 1/05; C22C 1/005; C22C 13/00; C22C 13/02; B23K 35/025; B23K 35/3006; B23K 35/262; B23K 35/22
See application file for complete search history.

(56) References Cited

U.S. PATENT DOCUMENTS

| | | | |
|---|---|---|---|
| 5,127,968 A | 7/1992 | Gomi et al. | |
| 6,217,671 B1 * | 4/2001 | Henderson | B23K 35/3618 148/23 |
| 8,221,518 B2 * | 7/2012 | Shearer | H05K 3/321 252/514 |
| 9,610,655 B2 * | 4/2017 | Hwang | H05K 3/3463 |
| 2009/0269598 A1 | 10/2009 | Ohashi et al. | |
| 2010/0159257 A1 | 6/2010 | Yamaguchi et al. | |
| 2013/0037314 A1 | 2/2013 | Yamaguchi et al. | |
| 2019/0232438 A1 * | 8/2019 | Hino | B23K 35/025 |

FOREIGN PATENT DOCUMENTS

| | | |
|---|---|---|
| JP | 3-184695 | 8/1991 |
| JP | 2005-194306 | 7/2005 |
| JP | 2006-035259 | 2/2006 |
| JP | 2009-283453 | 12/2009 |
| JP | 2013-035066 | 2/2013 |
| JP | 2014-028380 | 2/2014 |
| JP | 2014-072398 | 4/2014 |
| JP | 2020-140964 | 9/2020 |
| WO | 2013/147235 | 10/2013 |
| WO | 2013/187329 | 12/2013 |
| WO | 2015/050252 | 4/2015 |
| WO | 2015/170682 | 11/2015 |

OTHER PUBLICATIONS

Synthesis and thermal properties of low melting temperature tin/indium (Sn/In) lead-free nanosolders and their melting behavior in a vapor flux, Y. Shu et al. / Journal of Alloys and Compounds 626 (2015) 391-400.*

* cited by examiner

Primary Examiner — Haidung D Nguyen
(74) Attorney, Agent, or Firm — WENDEROTH, LIND & PONACK, L.L.P.

(57) ABSTRACT

A conductive paste includes: a solder powder having a melting point of less than or equal to 120° C.; a conductive filler; a flux for removing an oxide film of the solder powder; and a solvent, wherein a ratio of a mass of the conductive filler to a mass of the solder powder is 20% to 80%.

5 Claims, 1 Drawing Sheet

|  | SOLDER POWDER PART BY MASS (A) | Cu POWDER PART BY MASS (B) | C (=B/A) (%) | D (%) (= (A + B) WITH RESPECT TO PASTE MASS) | RESISTANCE (Ω) & EVALUATION |
|---|---|---|---|---|---|
| EXAMPLE 1 | 27 | 8 | 29.6 | 35.0 | 0.4 PASS |
| EXAMPLE 2 | 35 | 10 | 28.6 | 40.9 | 0.4 PASS |
| EXAMPLE 3 | 29 | 6 | 20.7 | 35.0 | 4.8 PASS |
| COMPARATIVE EXAMPLE 1 | 30 | 5 | 16.7 | 35.0 | 11.9 FAIL |
| COMPARATIVE EXAMPLE 2 | 31 | 4 | 12.9 | 35.0 | 22 FAIL |
| EXAMPLE 4 | 23 | 12 | 52.2 | 35.0 | 0.7 PASS |
| EXAMPLE 5 | 20 | 15 | 75 | 35.0 | 1.4 PASS |
| COMPARATIVE EXAMPLE 3 | 19 | 16 | 84.2 | 35.0 | 15.1 FAIL |
| EXAMPLE 6 | 15 | 10 | 66.7 | 27.8 | 1.8 PASS |
| EXAMPLE 7 | 45 | 15 | 33.3 | 48.0 | 1.2 PASS |
| COMPARATIVE EXAMPLE 4 | 7 | 3 | 42.9 | 13.3 | 31.8 FAIL |
| COMPARATIVE EXAMPLE 5 | 90 | 30 | 33.3 | 64.9 | POOR COATABILITY NON-UNIFORM FILM | p-MENTHANE: 57 PARTS BY WEIGHT    GLUTARIC ACID: 8 PARTS BY WEIGHT

C: RATIO (B/A) (%) OF Cu POWDER MASS (B) TO SOLDER POWDER MASS (A)
D: PROPORTION (%) OF (SOLDER POWDER MASS (A) + Cu POWDER MASS (B)) TO PASTE MASS
RESISTANCE VALUE (Ω) & EVALUATION: RESISTANCE VALUE (Ω) OF FORMED CONDUCTIVE FILM AND EVALUATION

CONDUCTIVE PASTE AND CONDUCTIVE FILM FORMED USING THE SAME

BACKGROUND

1. Technical Field

The present disclosure relates to a conductive film that can be used as an electrode of, for example, a semiconductor device, and a conductive paste for forming the conductive film.

2. Description of the Related Art

In organic semiconductor devices represented by organic electroluminescence (EL) devices, organic thin-film solar cells, organic field-effect transistors, and the like, gold (Au) is often used for a conductive film as an electrode in consideration of advantages such as conductivity and stability. As a method for forming a Au film, a dry process using a vacuum apparatus such as vapor deposition or sputtering, or a wet process such as plating can be used.

However, when a Au film is formed by such a method, the cost of film formation increases in terms of materials and processes. As a less expensive method for forming a conductive film, various methods have been studied in which a conductive paste formed using a conductive filler such as silver (Ag) or carbon and a binder is applied by printing, coating, or the like, and heated and cured to form a conductive film without using a vacuum apparatus (see, for example, PTL 1 below).

CITATION LIST

Patent Literature

PTL 1: Unexamined Japanese Patent Publication No. 2020-140964

SUMMARY

A conductive paste according to an aspect of the present disclosure includes (1) a solder powder having a melting point of less than or equal to 120° C., (2) a conductive filler, (3) a flux for removing an oxide film of the solder powder, and (4) a solvent, wherein a ratio of a mass of the conductive filler to a mass of the solder powder is 20% to 80%.

BRIEF DESCRIPTION OF THE DRAWINGS

FIG. 1 illustrates resistance values of conductive films respectively formed of 12 different conductive pastes.

DETAILED DESCRIPTIONS

When a conductive film is formed using a conductive paste including a conductive filler such as Ag or carbon, conductive particles in point contact with each other form a conductive path and the resistance of the point contact portion between such conductive particles increases, which causes problems in further improving the conductivity of the conductive film.

The present disclosure has been made in view of these problems, and an object of the present disclosure is to provide a conductive paste for forming a conductive film having excellent conductivity in a method for forming a conductive film using a conductive paste without requiring a vacuum apparatus.

A conductive paste according to an aspect of the present disclosure includes, at least (1) a solder powder having a melting point of less than or equal to 120° C., (2) a conductive filler, (3) a flux for removing an oxide film of the solder powder, and (4) a solvent, wherein a ratio of a mass of the conductive filler to a mass of the solder powder is 20% to 80%.

In a preferred aspect, in the conductive paste of the present disclosure, the solder powder and the conductive filler have an average particle diameter of less than or equal to 20 μm.

In a preferred aspect, in the conductive paste of the present disclosure, the solder powder is composed of a solder alloy containing indium (In).

In a preferred aspect, in the conductive paste of the present disclosure, the conductive filler is a filler of Cu, Ag or carbon, or may be any mixture of these fillers. In another preferred aspect, the conductive filler may contain at least one selected from Cu, Ag, and carbon, and at least one other conductive component (for example, Au, Sn, Ni, and the like) that may be used as necessary.

In a preferred aspect, in the conductive paste of the present disclosure, a proportion of a total mass of the solder powder and the conductive filler to a total mass of the solder powder, the conductive filler, the flux, and the solvent (equivalent to the total mass of the conductive paste when the conductive paste does not contain other components than these components) is 20% to 60%.

In a preferred aspect, in the conductive paste of the present disclosure, the solvent is a non-polar organic compound composed of C (carbon), H (hydrogen) and optionally other elements (for example, oxygen, nitrogen, and the like) that are liquid at room temperature (about 25° C.), and the flux is an organic acid that is solid at room temperature. This organic acid is particularly preferably in the form of a powder.

The conductive film according to an aspect of the present disclosure is formed using the above-described or later-described conductive paste.

A method for forming a conductive film according to an aspect of the present disclosure includes applying the above-described conductive paste to an object (for example, an organic semiconductor device) to form a layer of the conductive paste, and heating the layer of the conductive paste to a temperature more than or equal to the melting point of the solder powder, preferably a temperature at least 20° C. higher than the melting point to form a conductive film.

In the conductive paste according to an aspect of the present disclosure, a solder powder having a melting point of less than or equal to 120° C. as conductive particles and a conductive filler that is not solder are combined. In a case where the conductive paste contains only solder powder, when the conductive paste is heated, the solder powder melts and becomes spherical when the temperature exceeds its melting point. As a result, the conductive film to be formed, in which the conductive path includes such spherical solder, might not sufficiently function as a conductive film.

The conductive paste according to an aspect of the present disclosure containing particles of a conductive filler that is not solder powder inhibits the molten solder powder from becoming spherical even when the conductive paste reaches a temperature more than or equal to the melting point of the solder powder and enables solder to enter between the conductive particles to form a conductive path. As a result, sufficient conductivity of the conductive film can be secured.

When the solvent contained in the solder paste is a non-polar solvent composed of carbon (C), hydrogen (H), and optionally other elements, and the organic acid acting as a flux is a powder which is solid at normal temperature in the conductive paste according to an aspect of the present disclosure, a conductive film can be formed in a state where the organic material constituting an organic semiconductor device is hardly adversely affected (semiconductor device breakdown, for example, by chemical action such as chemical reaction and/or physical action such as dissolution of solvents, fluxes) by the conductive paste even when the conductive paste according to an aspect of the present disclosure is applied (for example, coated) to the surface of the organic semiconductor device.

Hereinafter, an exemplary embodiment of a conductive paste according to an exemplary embodiment of the present disclosure will be described in detail.

(Solder Powder)

The solder powder contained in the conductive paste of the present exemplary embodiment is composed of a solder alloy having a melting point of less than or equal to 120° C. Therefore, the solder powder has a melting point of less than or equal to 120° C. Such solder powder is particles composed of a solder alloy called low-temperature solder having a melting point of less than or equal to 120° C. When the melting point of the solder powder exceeds 120° C., there may be a problem that the properties of the organic semiconductor device deteriorate. From the viewpoint of reliability in an operating environment, the melting point of the solder powder is preferably more than or equal to 80° C.

Specifically, a solder powder of a solder alloy containing at least one metal selected from indium, tin, and bismuth is preferable. More specifically, the solder alloy may be composed only of such a metal or may be composed of such a metal and at least one other metal (for example, copper, silver, zinc, and the like).

Examples of the solder alloy constituting the solder powder used in the conductive paste of the present exemplary embodiment include at least one solder alloy selected from the group consisting of tin (Sn)-In based solder alloy, Sn-bismuth (Bi)-In based solder alloy, Bi—In based solder alloy, Sn—Ag based solder alloy, Sn—Ag-copper (Cu) based solder alloy, Sn—Ag—In based solder alloy, Sn—Cu—In based solder alloy, Sn—Ag—Cu—In based solder alloy, and Sn—Ag—Cu—Bi—In based solder alloy. That is, these solder alloys can be used singly or in combination of two or more of these solder alloys. Particularly preferred solder alloys are, for example, Sn—In based solder alloy and Sn—Bi—In based solder alloy. At least two of these various solder powders may be used in combination.

In a preferred aspect, the solder powder may be in the form of any appropriate minute object, and is preferably, for example, granular (may be spherical), in the form of thin section (flake), or the like. The minute object constituting the solder powder preferably have an average particle diameter of less than or equal to 20 μm, more preferably an average particle diameter of 0.5 μm to 15 μm. When the average particle size is larger than such a range, there may be a problem that the cost increases as the conductive film becomes thicker, and when the average particle size is smaller than such a range, there may be a problem that the meltability of the solder deteriorates.

The average particle diameter mentioned in the present specification means "a volume cumulative particle diameter D50 measured by a laser diffraction/scattering particle size distribution analyzer".

(Conductive Filler)

The conductive filler contained in the conductive paste of the present exemplary embodiment has a melting point with which the conductive filler does not melt when the conductive paste is heated to melt the solder powder. Preferably, the melting point of the conductive filler is more than or equal to 200° C. When the melting point is less than 200° C., there may be a problem that the conductive filler melts when the conductive paste is excessively heated. Similarly to the solder powder, the conductive filler may be in the form of any appropriate minute object, and may be, for example, granular (may be spherical), in the form of flak, fine granular, in the form of thin section, amorphous lump, or the like. Examples of such a conductive material include metal (for example, copper (Cu), Ag, nickel (Ni), Au, and an alloy of at least one of these metals and another metal) and carbon (for example, carbon black, graphite, and nanocarbon). As a particularly preferred conductive filler, a granular (for example, spherical) minute object composed of Cu, Ag can be exemplified. At least two of these various conductive fillers may be used in combination.

In another aspect, the conductive filler may be a minute object having a coating of the above-described conductive material, that is, a composite minute object. For example, a Cu filler having a Au coating on the surface can be exemplified as the conductive filler.

In a preferred aspect, the minute object constituting the conductive filler preferably have an average particle diameter of less than or equal to 20 μm, more preferably an average particle diameter of 0.5 μm to 15 μm. The "average particle diameter" of the conductive filler mentioned here is used in the same meaning as in the case of solder powder.

In the conductive paste of the present exemplary embodiment, the ratio of the mass (B) of the conductive filler to the mass (A) of the solder powder (that is, B/A) is 20% to 80%, preferably 30% to 50%.

When the ratio is smaller than such a range, the amount of solder powder connecting the conductive fillers in the conductive film is insufficient, and a part of the conductive path is formed by point contact between the conductive particles, and as a result, the conductivity of the conductive film to be formed tends to be insufficient. When the ratio is larger than such a range, the amount of the solder powder that solidifies in a spherical shape without connecting the conductive fillers in the conductive film increases, and the conductivity of the conductive film to be formed tends to be insufficient.

(Flux)

The flux contained in the conductive paste of the present exemplary embodiment has a reducing power capable of removing an oxide film on the surfaces of an object to which the conductive paste is applied (that is, an adherend, for example, an organic semiconductor device), an electrode of the object, and the solder powder and/or the conductive filler. For example, an organic acid, a halogen salt of an amine, an amine organic acid salt, or the like is used as the flux.

Examples of the organic acid include saturated aliphatic monocarboxylic acids such as lauric acid, myristic acid, palmitic acid, and stearic acid; unsaturated aliphatic monocarboxylic acids such as crotonic acid; saturated aliphatic dicarboxylic acids such as oxalic acid, L(−)-malic acid, malonic acid, succinic acid, glutaric acid, adipic acid, pimelic acid, suberic acid, azelaic acid, and sebacic acid; unsaturated aliphatic dicarboxylic acids such as maleic acid and fumaric acid; aromatic carboxylic acids such as phthalaldehyde acid, phenylbutyric acid, phenoxyacetic acid, and phenylpropionic acid; ether-based dicarboxylic acids such as diglycolic acid, and other organic acids such as abietic acid and ascorbic acid.

Examples of the halogen salt of an amine include amine hydrochlorides such as ethylamine hydrochloride, diethylamine hydrochloride, dimethylamine hydrochloride, cyclohexylamine hydrochloride, triethanolamine hydrochloride, and glutamic acid hydrochloride, and amine hydrobromides such as diethylamine hydrobromide and cyclohexylamine hydrobromide.

Examples of the amine organic acid salt include propylamine, butylamine, hexylamine, heptylamine, triethanolamine, and mixtures with adipic acid, diethylglutaric acid, glutaric acid, succinic acid, and malonic acid.

The flux may be a liquid or a solid at room temperature (for example, 25° C.), and at least two of the above components may be used in combination. The flux may be solid at room temperature (for example, 25° C.), in a particularly preferred aspect, in a powder form, to avoid that an object to which the conductive paste is applied, specifically, at least a part of the object to which the conductive paste is applied, for example, an organic material part of an organic semiconductor device as an object, is affected by the flux contained in the applied conductive paste (for example, the flux contained in the conductive paste dissolves the organic material).

(Solvent)

In a preferred aspect, the solvent contained in the conductive paste of the present exemplary embodiment may be a non-polar organic compound, for example, a hydrocarbon, an alcohol, an amide, or the like, and examples thereof include alcohols (2-propanol, 1-butanol, 2-butanol, hexanol, 1,2-propanediol, heptanol, cyclohexanol, etc.), glycol ethers (ethylene glycol monobutyl ether, diethylene glycol and monomethyl ether, etc.), aromatic hydrocarbons (xylene, etc.), aliphatic hydrocarbons (dodecane, decane, nonane, octane, p-menthane, etc.), amides (dimethylformamide, dimethylacetamide, dimethylsulfoxide, etc.), and others (N-methylpyrrolidone siloxane, etc.). Two or more of these solvents may be combined.

To avoid that an object to which the conductive paste is applied, specifically, at least a part of the object to which the conductive paste is applied (for example, an organic material part of an organic semiconductor device as an object) is affected by the solvent contained in the applied conductive paste (for example, the solvent contained in the conductive paste dissolves the organic material), it is particularly preferable that the solvent is inactive (does not substantially adversely affect) to the object to which the conductive paste is applied.

For example, when the object to which the conductive film is formed is an organic semiconductor device, the solvent is preferably one that does not substantially dissolve the organic material of the organic semiconductor device, and for example, it is particularly desirable to use aliphatic hydrocarbons as the solvent.

(Other Component)

In a preferred aspect, the conductive paste may include another component as necessary. For example, the conductive paste may have a resin component that functions as a binder, and can improve adhesion of the conductive film to be formed to the object and bending resistance of the conductive film to be formed. As the resin component, for example, a cellulose derivative, polyvinyl acetal, a polyester-based resin, or the like can be used. A cellulose derivative is more preferable.

In another preferred aspect, the conductive paste may include another component as necessary. As such another component, a thixotropic agent for controlling viscosity may be contained. Including such a component has an effect that the application stability of the paste improves.

The conductive film according to an aspect of the present disclosure can be formed by applying the above-described conductive paste by, for example, coating to an object such as an organic semiconductor device to form a layer of the conductive paste, and heating the layer of the conductive paste to a temperature more than or equal to the melting point of the solder powder, preferably a temperature at least 20° C. higher than the melting point, more preferably a temperature at least 40° C. higher than the melting point.

EXAMPLES

Example and Comparative Example

Example 1

As an Example, a conductive paste was prepared using the following materials, and the resistance value of a conductive film formed by applying the paste onto a glass plate was evaluated.

A solder powder of 25Sn-55Bi-20In (melting point: 96° C.) having an average particle diameter (based on a volume cumulative particle diameter D50 measured by a laser diffraction/scattering particle size distribution analyzer) of 10 μm was used.

A Cu powder having an average particle diameter (based on a volume cumulative particle diameter D50 measured by a laser diffraction/scattering particle size distribution analyzer) of 5 μm was used as a conductive filler.

Glutaric acid was used as a flux.

p-Menthane was used as a solvent.

Eight parts by weight of glutaric acid, 27 parts by weight of the solder powder, and 8 parts by weight of the Cu powder were added to 57 parts by weight of p-menthane, and the mixture was kneaded with a vacuum planetary mixer for 10 minutes to obtain a conductive paste of Example 1.

A polyimide tape having a thickness of 100 μm was attached to both edges of a slide glass plate having a thickness of 1 mm, the conductive paste was supplied between the tapes, and then the paste was flattened along the upper face of the polyimide tapes with a squeegee to apply a conductive paste layer (thickness: 100 μm) onto the slide glass plate. The slide glass plate was heated on a hot plate set at 120° C. for 5 minutes to form a conductive film.

The resistance value of the formed conductive film was evaluated by measuring the resistance value at a distance of 1 cm using a tester. A sample having a resistance value of less than 10Ω was evaluated as pass, and a sample having a resistance value of more than or equal to 10Ω was evaluated as fail.

The resistance value of the conductive film formed using the conductive paste of Example 1 was 0.4Ω, which was evaluated as pass.

Examples 2 to 7 and Comparative Examples 1 to 3

In the same manner as in Example 1, various conductive pastes of Examples 2 to 7 and Comparative Examples 1 to 3 were prepared, and the resistance values of the conductive films formed in the same manner as in the method described above were evaluated. The amounts of the solder powder and the amounts of the Cu powder used for preparing the conductive pastes of Examples and Comparative Examples, and the evaluation results are shown in Table 1 below. In each Example and Comparative Example, the blending amount of p-menthane was 57 parts by weight, and the blending amount of glutaric acid was 8 parts by weight.

In a comparison between the results of Examples 1 to 7 and the results of Comparative Examples 1 to 3, the resistance values of the conductive films formed using the conductive pastes of Examples in which a ratio $C(=B/A)$ of the mass (B) of the Cu powder to the mass (A) of the solder powder was 20% to 80% were all evaluated as pass. It is considered that the conductive films in these Examples exhibit low resistance values because the molten solder connects the particles of the Cu powder. However, when the ratio of the Cu powder is too large as in Comparative Example 3, the amount of the molten solder connecting the particles of the Cu powder is insufficient, and the resistance value increases. Conversely, when the ratio of the Cu powder is too small as in Comparative Examples 1 and 2, it is considered that the molten solder does not effectively connect the particles of the Cu powder, and the proportion of aggregation increases, and as a result, a uniform conductive film is not formed, and the resistance value increases.

When the total mass of the solder powder and the conductive filler is 20% to 60%, preferably 30% to 50% based on the mass of the whole conductive paste (=A+B+the mass of p-menthane+the mass of glutaric acid), the resistance value of the conductive film to be formed satisfies the target (less than 10Ω). However, when the proportion D of the total mass of the solder powder and the conductive filler to the mass of the conductive paste is too small as shown in Comparative Example 4, the amount of the conductive components (that is, solder and Cu) is insufficient, and the resistance value increases. Conversely, when the proportion D of the total mass of the solder powder and the conductive filler is too large exceeding 60% as in Comparative Example 5, the conductive paste has a high viscosity and poor coatability, and therefore a uniform conductive film cannot be formed.

The conductive paste according to an aspect of the present disclosure has a property that a conductive film having excellent conductivity can be formed only by applying the paste to an object by, for example, coating and then heating the paste at a relatively low temperature, and is useful in the case of forming a conductive film to be formed in an organic semiconductor device represented by an organic EL device, an organic thin-film solar cell, an organic field-effect transistor, or the like. The conductive paste also has an advantage that a conductive film can be formed without requiring a vacuum apparatus.

A conductive paste may include (1) solder powders having a melting point of less than or equal to 120° C.; conductive fillers; a flux for removing oxide films of the solder powders; and a solvent. A ratio of a mass of the conductive fillers to a mass of the solder powders may be 20% to 80%.

What is claimed is:

1. A conductive paste comprising:
    a solder powder having a melting point of less than or equal to 120° C.;
    a conductive filler;
    a flux for removing an oxide film of the solder powder; and
    a solvent,
    wherein the conductive filler consists of copper (Cu),
    wherein a ratio of a mass of the conductive filler to a mass of the solder powder is 20.7% to 75%, and
    wherein a proportion of a total mass of the solder powder and the conductive filler to a total mass of the solder powder, the conductive filler, the flux, and the solvent is 27.8% to 48%.

2. The conductive paste according to claim 1, wherein the solder powder and the conductive filler both have an average particle diameter of less than or equal to 20μm.

3. The conductive paste according to claim 1, wherein the solder powder is a Sn-Bi-In based solder alloy.

4. The conductive paste according to claim 1, wherein
    the solvent is an aliphatic hydrocarbon, and
    the flux is a powder of an organic acid that is solid at room temperature.

5. A conductive film formed with the conductive paste according to claim 1.

* * * * *